COLOR CONTROL SYSTEM

Filed June 27, 1947 2 SHEETS--SHEET 1

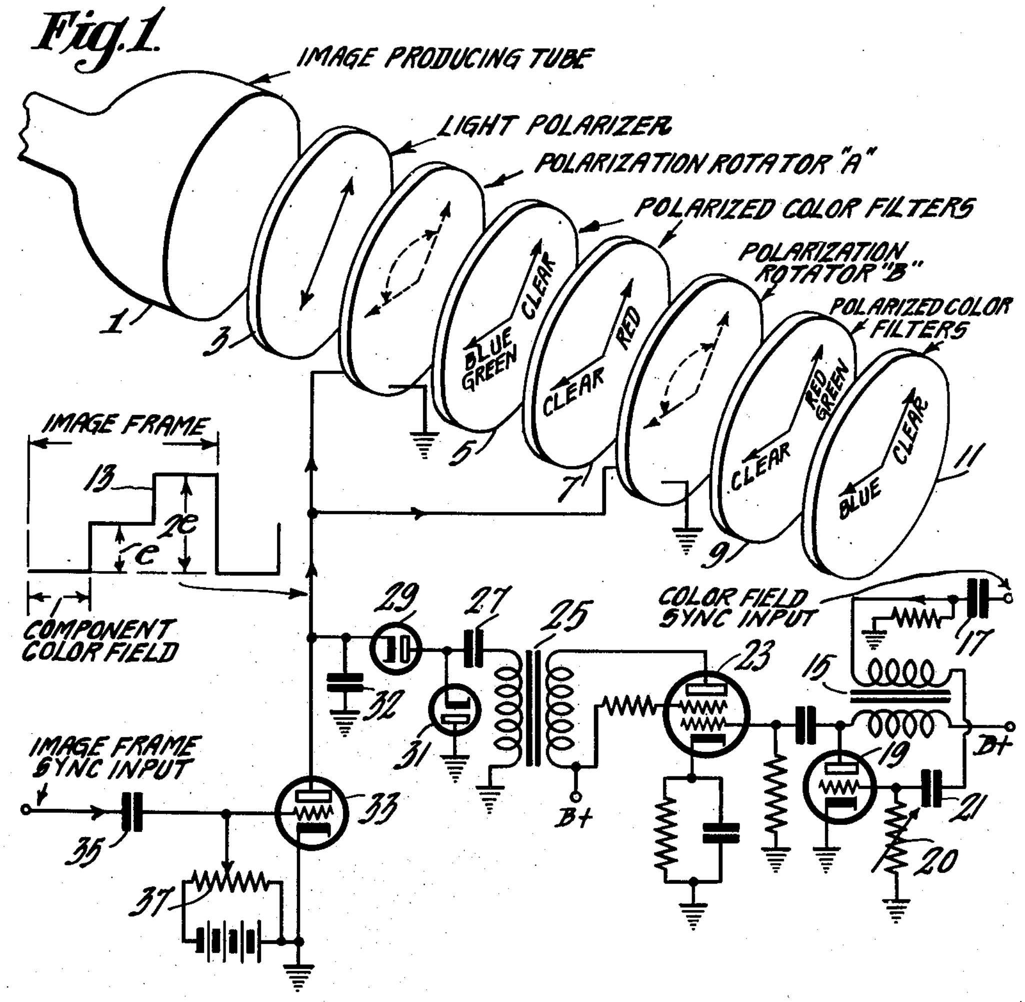

Fig.1

| POTENTIAL | POLARIZER | POLARIZATION ROTATOR "A" | FILTER BLUE-GR | FILTER RED | POLARIZATION ROTATOR "B" | FILTER RED-GR | FILTER BLUE | RESULTANT COLOR |
|---|---|---|---|---|---|---|---|---|
| 0 | VERT. | HOR. | BLUE GR | CLEAR | HOR. | CLEAR | BLUE | BLUE |
| e | VERT. | HOR. | BLUE GR | CLEAR | VERT. | RED GR | CLEAR | GREEN |
| 2e | VERT. | VERT. | CLEAR | RED | VERT. | RED GR | CLEAR | RED |

INVENTOR.
George L. Fernsler
BY Samuel B. Smith
ATTORNEY

| POTENTIAL | POLARIZER | POLARIZATION ROTATOR #1 | FILTER RED | POLARIZATION ROTATOR #2 | FILTER BLUE | POLARIZATION ROTATOR #3 | FILTER GREEN | RESULTANT COLOR |
|---|---|---|---|---|---|---|---|---|
| 0 | HOR. | HOR. | CLEAR | HOR. | CLEAR | VERT. | GREEN | GREEN |
| e | HOR. | HOR. | CLEAR | VERT. | BLUE | HOR. | CLEAR | BLUE |
| 2e | HOR. | VERT. | RED | HOR. | CLEAR | VERT. | CLEAR | RED |

INVENTOR.
George L. Fernsler
BY Samuel B. Smith
ATTORNEY

Patented Feb. 19, 1952

2,586,635

UNITED STATES PATENT OFFICE 2,586,635

COLOR CONTROL SYSTEM

George L. Fernsler, Lawrenceville, N. J., assignor to Radio Corporation of America, a corporation of Delaware Application June 27, 1947, Serial No. 757,625

4 Claims. (Cl. 178—5.4)

Figure 2:
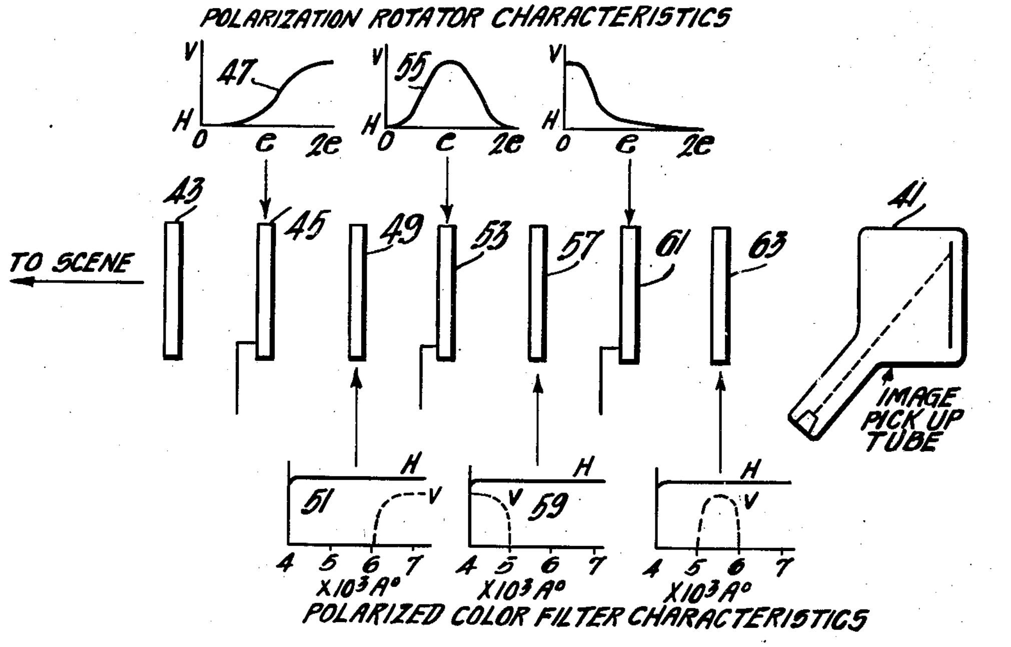

This invention relates to non-mechanical color changers and more particularly those color image reproducing systems such as may be employed in television systems which produce images in substantially natural color.

As is well known in the optical art, any color may be produced by combining several selected component colors, such as, for example, red, blue and green.

When monochromatic light is passed into one-half of a photometric field and a suitable mixture of three properly selected component colors is passed into the other half, it will be possible to very nearly match every color in the color spectrum. A graph may be drawn whereby relative intensities are plotted against the wave length of each of the selected independent or component colors. Three curves will result. These curves are normally known as stimulus curves.

The International Committee on Illumination has adopted a set of such curves as a standard. The selected compound colors employed in any color matching are not restricted, except that they must be independent of each other.

In any color reproduction system, the selected components should be so chosen that the area included within the I. C. I. triangle whose apices are the loci of the colors in the chromacity diagram should be as large as possible. One given set of such primaries would be three monochromatic colors of wave lengths, 7.0, 5.35 and 4.0 times $10^3$ Angstroms.

Images in substantially their natural color may be reproduced by the combination of several selected component color images superimposed in proper registry.

In the television art, for example, images in substantially their natural color are reproduced at a remote point by transmitting signals representative of selected component color portions of an object being scanned and maintaining their separate identity throughout the system.

In presently used sequential color television processes, a single television camera is exposed in succession to images giving color separation corresponding to the various selected component colors. During the period that the camera is exposed to each color component image, the light sensitive mosaic electrode of the camera tube is concurrently scanned in well-understood manner to enable the transmission of signals representing the corresponding color separation image.

In the conventional sequential multi-color television receiver, a given image producing tube produces a black and white image which corresponds to each given color component. This image is viewed or projected through a color filter of the component color corresponding to the desired component color instantaneously to be represented, and such an image representation persists substantially only during the period of the scanning of the fluorescent screen of the image producing tube for that component color image. The process is then repeated for the next color component, and so on, with different component color filters successively coming between the tube screen and the observer. Thus, a brief flashing of each color component image recurs cyclically.

A more complete reference to sequential television systems may be found in an article by R. D. Kell, G. L. Fredendall, A. C. Schroeder and R. C. Webb, entitled "An Experimental Color Television System," beginning on page 141 of the "RCA Review" for June 1946.

In accordance with the sequential systems outlined above, the change in component color selection is accomplished by the mechanical rotation of a drum or disk having filter elements of the selected component colors arranged in a predetermined recurring sequence and in such a manner that, if the disk or drum at the receiver is rotated in synchronism with the disk or drum at the transmitter, a substantially true natural color reproduction of the transmitted image may be had.

Any mechanical movement such as that employed in the rotation of the color filter referred to above is accompanied by certain disadvantages, such as bulk, maintenance, and a certain degree of noise, which becomes particularly objectionable when the sound accompanying the image transmission is at a relatively low level.

It therefore becomes desirable for the improvement of natural color television systems that an all-electronic arrangement be provided to cause the necessary changing of the color production.

The polarization of light receives considerable space in modern textbooks on physical optics, such as "Physical Optics" by Robert W. Wood, published by Macmillan Co. in 1934, and needs no explanation here, except perhaps to outline briefly the theory of light polarization as applied in the practice of this invention.

It is well known to the art that a beam of light is polarized when passing through polarizing elements such as Iceland spar, Nicol prisms, and other well known light polarizers, such as, for example, commercially manufactured "Polaroid" shown and described in the following patents to E. H. Land: 1,951,664, March 20, 1934; 1,956,867, May 1, 1934; 1,989,371, January 29, 1935; 2,011,553, August 13, 1935, and in patent to E. H. Land et al. No. 1,918,848, dated July 18, 1933; still another type of light polarizing element is shown and described in the patent to J. F. Dreyer, No. 2,400,877, dated May 28, 1946.

When a beam of light is polarized and allowed to fall upon a second polarizing medium, the intensity of the light beam after transmission through both the polarizing mediums varies proportional to the square of the cosine of the angle between the two planes of polarization. This is known as the law of Malus which is explained in almost all popular textbooks on optical physics, such as, for example, page 602 of "Principles of Optics" by Hardy and Perrin, published in 1932. It therefore follows that, by employing two adjacent polarizing mediums, an interruption to the light beam may be provided by rotating the plane of polarization of one of the polarizing mediums.

Some organic liquids, when subjected to an electric field, lose their isotropic optical properties and become birefringent. This is well known as the Kerr effect. When a beam of polarized light passes through a birefringent material, the velocity with which it traverses the substance depends upon the direction of the electric vector of the incident light. It may be stated that the index of refraction of the material depends upon the direction of propagation and plane of polarization of the light. The direction through the material for which the index is independent of the plane of polarization is generally known as the optical axis, and the material may be classified as uniaxial. Materials which exhibit the Kerr effect are uniaxially birefringent under the influence of an electric field with the optical axis in the direction of the electric field.

The molecular action of the material under an electric field may be explained by stating first of all that each molecule contains an equal positive and negative charge which can be displaced relatively in some preferential direction. In the absence of a strong constant electric field, the molecules are normally randomly oriented and the medium may be considered as isotropic. Upon the application of an electric field, there is an orientation of the random position of the molecules, thus making the material anisotropic.

The Kerr effect has already been proposed for television systems for use in interrupting a light beam for scanning operations. Its application is shown and described in the book entitled "Television" by V. K. Zworykin and G. A. Morton, published by John Wiley & Sons, Inc., in 1940.

Polarizing materials also have an important property by which they can be made to become color filters for light passing through them whose plane of polarization takes a predetermined angle, and should a light be polarized in a direction substantially 90° to the aforementioned plane of polarization, the light will pass through the polarizing filter medium without any spectral change. Such a polarized color filter may be constructed, for example, by combining a suitable dye with the crystalline structure of the polarizing medium.

It will be seen, therefore, that by properly combining polarizing elements and polarized color filters and by providing for a predetermined rotation of polarization angles, a desired optical effect may be produced, such as, for example, a change in sequence among several selected component colors in such a manner that any color or tint may be provided. It also becomes evident that images in substantially their natural color may be produced without the disadvantages of mechanical color filter changes by placing a series of elements such as referred to above closely adjacent each other and between an observer and a black and white image producing device in a manner similar to that employed in the mechanical positioning of color filters well known in the television art.

According to this invention, a series of light polarization rotaters and polarized color filters are so associated that any desired color may be produced by the application of proper electric potentials to the polarization rotaters. An electric circuit arrangement is provided whereby a resultant color change may be made, in accordance with a predetermined recurring sequence based upon synchronizing signal energy.

A primary object of this invention is to provide an improved color control system.

Another object of this invention is to provide for color changes by all-electronic devices.

Still another object of this invention is to provide an improved color television system.

Other and incidental objects of the invention will be apparent to those skilled in the art from a reading of the following specification and an inspection of the accompanying drawing in which Figure 1 shows schematically one form of this invention illustrating one combination of polarization rotaters and polarization color filters, together with an accompanying circuit diagram of a polarizing voltage generating device; and Figure 2 illustrates another order and form of polarized elements with accompanying graphs and charts for purposes of explanation of the operation of this invention.

Turning now in more detail to Figure 1, there is provided for the purposes of furnishing a source of light an image producing tube 1, such as, for example, that commonly employed in television systems and shown and described in detail in the published art, such as, for example, an article by Dr. V. K. Zworykin entitled "Description of an Experimental Television System and Kinescope," published in the "Proceedings of the Institute of Radio Engineers" for December, 1933. Other sources of light may be employed, but for purposes of explanation of the operation of this invention in one of its forms, its employment in connection with a color television system will be shown and described.

A series of elements as illustrated in Figure 1, although separated for the purpose of illustration, may be positioned closely adjacent to each other and to the image producing tube 1. The light polarizer 3 is positioned adjacent the image producing tube 1 and may, for example, take the form of any light polarizer, such as the popular "Polaroid." It will be seen that light emerging from the light polarizer 3 will have a plane of polarization, as indicated, for example, in the vertical direction.

Adjacent to the light polarizer 3 there is located a polarization rotater A, which normally rotates the plane of polarization 90° to the horizontal position when there is no potential applied thereto. Upon the application of a potential, however, the plane of polarization is rotated to a vertical direction.

Next adjacent the polarization rotater A, there is located a blue-green polarized color filter 5. The polarized color filter 5 has the property that a light passing therethrough having a vertical plane of polarization will pass through without a change. However, a white light horizontally polarized will be changed to a blue-green upon passing through the polarized color filter 5.

Next adjacent to the blue-green polarized color filter, there is positioned a red polarized color filter 7, which transmits horizontally polarized light without change, but passes only red light of vertically polarized light.

Next adjacent the red polarized color filter 7, there is positioned a polarization rotater B, whose normal plane of polarization is in a horizontal direction when no potential is applied thereto.

Following the polarization rotater B, there is positioned a red-green polarized color filter 9 which transmits light having a horizontal plane of polarization without change, but produces a red-green light upon interception of a light having a vertical plane of polarization.

Adjacent the polarized color filter 9 is positioned a blue polarized color filter 11 passing blue light upon intercepting a light of horizontal polarization and not changing the color of the light intercepted having a vertical plane of polarization.

Referring now to the chart positioned below the circuit diagram, it will be seen that, upon the application of no voltage to the polarization rotating elements, a white light produced at the image producing tube 1 will appear blue by viewing the image producing tube 1 through the elements illustrated.

Upon the application of a potential *e*, the characteristics of the polarization rotater A are so chosen that there will be no change, but the characteristics of polarization rotater B are so selected that the horizontally polarized light striking the polarization rotater B will be rotated to a vertical plane of polarization. The light produced or the resultant color will therefore be green, as indicated in the chart accompanying Figure 1.

Upon an application of a potential 2*e*, polarization rotater A will be caused to pass vertically polarized light along with polarization rotater B. The resultant color will then be red, as indicated.

As has previously been described, images in substantially their natural color are transmitted by breaking down the images into several selected component colors and transmitting them sequentially in a predetermined recurring sequence.

For the purpose of explanation, it will be assumed, for example, that the signal standards employed provide for three independent color fields transmitted in recurring sequence, each field being governed by a color field synchronizing signal and each complete color image or image frame comprising several different selected color field scannings being synchronized by an image frame synchronization signal.

As has been explained above, the three selected component colors may be produced by providing three different voltage levels, such as illustrated in curve 13, wherein the image frame time interval comprises three separate component color fields whose voltages are 0, *e* and 2*e*. The sequence of 0 voltage, *e* voltage and 2*e* voltage repeats for each image frame time interval.

It is assumed, for purposes of explanation of the operation of this invention, that the natural color image signal contains both color field synchronizing pulses and image frame synchronizing pulses. It is not the purpose of this explanation to limit such synchronizing signals to any particular form, and the practice of this invention may be had with any type of synchronizing signal, providing that both the field and the frame synchronizing signals are available.

It is intended further that, although field and frame synchronizing signals are employed, the practice of this invention is not limited thereto, but the teachings of this invention are applicable to other combinations of synchronizing signals involving any system wherein selected component color signals are transmitted sequentially, whether they be representative of a complete or partial image.

In the particular form of the invention shown in Figure 1, a color field synchronizing signal is fed to the transformer 15 through a coupling condenser 17. Transformer 15, in conjunction with tube 19, forms a synchronized pulse generator of the single swing blocking oscillator type.

The blocking oscillator is widely used to produce pulses synchronized by a control voltage. The blocking oscillator circuit may be considered an ordinary tuned grid oscillating circuit having a very high ratio of inductance to capacity and very close coupling between the grid and plate circuits, together with an extremely high grid-leak resistance 20. Such a circuit arrangement provides an extreme case of intermittent oscillations since, as the oscillations start to build up, the grid-leak-condenser combination 20 and 21 develops a bias far beyond cut-off within a single cycle. Circuit proportions are chosen such that instability then occurs, and the circuit oscillations cease. This results because any tendency for the ampuitude to decrease produces progressively greater tendency for the amplitude to become less. since the bias on the grid-leak-condenser combination 20 and 21 cannot quickly readiust readily itself to the reduced amplitude, but rather causes the tube 19 to act momentarily as though it had a fixed bias much greater than cut-off. When the oscillations cease, the grid-leak resistance 20 slowly discharges the charge on the grid condenser 21 until the bias becomes less than cut-off, at which point oscillations start to build up again very rapidly and the cycle then repeats itself.

Although a blocking oscillator is shown and described, any type oscillator capable of producing a reasonable sharp pulse is satisfactory and may be substituted without departing from the spirit of this invention.

The signal pulses generated by the blocking oscillator are amplified in tube 23 and passed to transformer 25. When the terminal of transformer 25, which is connected to condenser 27, is charged positively as a result of the signal pulse applied thereto, a current will flow through diode 29, charging storage condenser 32 in a positive direction. For the purpose of explanation, let it be assumed, for example, that upon the application of one pulse, condenser 32 will take a charge equal to *e* volts, as indicated in curve 13. As the terminal of the secondary of transformer 25 completes a cycle in a negative direction, diode 29 will become an open circuit, but diode 31 will cause condenser 27 to charge to a voltage equivalent to the negative peak of transformer 25. It follows, therefore, that when the potential of the output terminal of transformer 25 returns to 0 potential, condenser 27 has a charge equal to the negative voltage swing of the transformer 25, or substantially equal to voltage $e$ of curve 13. Upon the application of the next signal pulse to transformer 25, which is added to the potential already charged in condenser 27, tube 29 will become conducting to charge condenser 32 to twice the voltage $e$ or $2e$.

In order to repeat the sequence just completed, it is necessary that condenser 32 be discharged rapidly to 0 potential. This discharge is accomplished by making tube 33 conductive by an image frame synchronizing signal applied to the control electrode of tube 33 through input condenser 35. The bias potential for tube 33 is adjusted, for example, by a potentiometer 37 to cut the current flow off from tube 33, except during the image frame synchronizing pulse signal. Therefore, at the beginning of each image frame or complete color image, condenser 32 is discharged to return the potential across the polarization rotaters back to a 0 value.

Turning now to Figure 2, there is shown another arrangement of polarizing the elements and polarized color filters whose characteristics are illustrated by associated curves. In the illustration shown in Figure 2, an image pick-up or transmitting tube 41 is shown to illustrate the application of this invention to transmitting systems. Although the popular iconoscope is shown, any suitable image pick-up device may be employed. The theory and operation of image pick-up devices will not be taken up here, but may be found in the published art, such as, for example, in an article by V. K. Zworykin, G. A. Morton, and L. E. Flory entitled "Theory and Performance of the Iconoscope," beginning on page 1071 of the "Proceedings of the Institute of Radio Engineers" for August 1937.

Light from the scene being televised is intercepted by a horizontal polarizing element 43. Next to the horizontal polarizing element 43 there is positioned a polarization rotater 45 having a characteristic as indicated in curve 47. It will be seen that, for 0 potential, polarization rotator 45 provides for the transmission of horizontally polarized light. At potential $e$, although a slight change is noted, the principal plane of polarization is horizontal. Upon the application of a potential $2e$ to the polarization rotater 45, there will be passed only a vertical polarized light.

A polarized color filter 49 is positioned adjacent the polarization rotater 45 and has a transmission characteristic as indicated in curve 51. It will be seen that polarized color filter 49 transmits light without interference which has been polarized in a horizontal direction, but passes only red light when intercepting light polarized in a vertical direction.

Positioned next to the polarized color filter 49 is polarization rotater 53, whose characteristic is indicated in curve 55. Polarization rotater 53 contains characteristics such that at potentials 0 and $2e$, only horizontally polarized light will be transmitted, however, at potential $e$ only vertical polarized light will be transmitted.

Positioned adjacent polarization rotater 53 is a polarized color filter 57 having a characteristic as indicated in curve 59, such that a vertically polarized light will transmit only blue light therethrough and a horizontally polarized light will pass through polarized color filter 57 without interference.

The next element in line is a polarization rotater 61, whose characteristics are so chosen that at 0 potential only vertically polarized light will be transmitted therethrough. At $e$ potential, the light transmitted through polarization rotater 61 will be substantially horizontally polarized. At potential $2e$ only horizontally polarized light will be transmitted.

The final element in the system is polarized color filter 63, which transmits only green light upon vertical polarization, while horizontally polarized light passes therethrough without interference.

Upon the application of the different voltages indicated to the polarization rotaters, the three component colors, green, blue and red, can be produced. The explanation of the action by the elements is illustrated in the chart at the bottom of Figure 2 and is believed to be self-explanatory.

The potentials may be applied to the polarization rotaters 45, 53 and 61 in a manner similar to that illustrated in connection with the form of the invention shown in Figure 1.

The characteristics and operation of "Polaroid" have received considerable publication, and further information thereon may be obtained by reference to the patents listed above and the early articles on the subject, such as, for example, an article by Edwin H. Land entitled "Polaroid and the Headlight Problem," beginning on page 269 of the "Journal of the Franklin Institute" for September, 1937, and in an article by L. R. Ingersoll, J. G. Winans and E. H. Krause entitled "The Polarizing Characteristics of Polaroid Plates for Wave-Lengths 4000A to 20,000A," beginning on page 233 of the "Journal of the Optical Society of America" for June, 1936.

Having thus described the invention, what is claimed is:

1. An image producing system of the type embodying an image reproducing tube, said system comprising in combination a light polarizing element, a plurality of selective polarized color filter elements, a plurality of birefringent elements interpositioned between some of said filter elements, said birefringent elements having different respective potential response characteristics and wherein all of said elements are positioned along an optical axis of said tube, and means for applying to said birefringent elements a potential wave having a plurality of different potential values to produce selected colors.

2. An image producing system of the type embodying an image reproducing tube, said system comprising in combination a light polarizing element, a plurality of polarized monochrome filter elements, a plurality of birefringent elements separated by at least one of said filter elements, said birefringent elements having different respective potential response characteristics and wherein all of said elements are positioned along an optical axis of said tube, and means for applying to said birefringent elements a potential wave having a plurality of different potential values to produce selected colors in predetermined recurring sequence.

3. In a television system wherein signal energy representative of different selected component colors is transmitted in sequence, together with synchronizing signals identifying each completed image transmission and each change in selected component color, an image reproducing system of the type embodying an image reproducing tube, said system comprising a light polarizing element, a plurality of selective polarized color filter elements, a plurality of birefringent elements, said birefringent elements being interspersed with said filter elements, and having different respective potential response characteristics, and wherein all of said elements are positioned along an optical axis of said tube, and means for applying to said birefringent elements a potential wave having a plurality of different potential values to produce selected colors in the same sequence in which the color representative signal energy is transmitted, said different potential values being in synchronism with said synchronizing signals identifying each change in selected component colors.

4. In a television system wherein signal energy representative of different selected component colors is transmitted in sequence, together with synchronizing signals identifying each completed image transmission and each change in selected component color, an image reproducing system of the type embodying an image reproducing tube, said system comprising in combination a light polarizing element, a plurality of polarized monochrome filter elements, a plurality of polarization plane rotating elements, said polarization plane rotating elements having different potential response characteristics, and wherein all of said elements are positioned along an optical axis of said tube, means for applying to said polarization plane rotating elements a potential wave having a plurality of different potential values, each representative of one of said selected component colors, and wherein said means for applying said potential wave to said polarization plane rotating elements comprises a stair step wave generating circuit, each of whose steps are in synchronism with said synchronizing signals identifying each change in selected component colors and whose steps recur in like groups timed by said synchronizing signal identifying each completed image.

GEORGE L. FERNSLER.

REFERENCES CITED

The following references are of record in the file of this patent:

UNITED STATES PATENTS

| Number | Name | Date |
|---|---|---|
| 2,002,515 | Worrall | May 28, 1935 |
| 2,109,540 | Leishman | Mar. 1, 1938 |
| 2,118,160 | Cawley | May 24, 1938 |
| 2,184,999 | Land | Dec. 26, 1939 |
| 2,263,684 | Ryan | Nov. 25, 1941 |
| 2,328,219 | Land | Aug. 31, 1943 |
| 2,350,892 | Hewson | June 6, 1944 |
| 2,389,979 | Huffnagle | Nov. 27, 1945 |
| 2,493,200 | Land | Jan. 3, 1950 |